(12) United States Patent
Song et al.

(10) Patent No.: US 9,729,872 B2
(45) Date of Patent: Aug. 8, 2017

(54) METHOD AND APPARATUS FOR ENCODING/DECODING IMAGES TO MINIMIZE REDUNDANCY OF INTRA-PREDICTION MODE

(75) Inventors: Jinhan Song, Seoul (KR); Jeongyeon Lim, Seongnam-si (KR); Kibaek Kim, Seoul (KR); Jechang Jeong, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 1045 days.

(21) Appl. No.: 13/990,269

(22) PCT Filed: Nov. 25, 2011

(86) PCT No.: PCT/KR2011/009080
§ 371 (c)(1),
(2), (4) Date: Jun. 14, 2013

(87) PCT Pub. No.: WO2012/074248
PCT Pub. Date: Jun. 7, 2012

(65) Prior Publication Data
US 2013/0259128 A1 Oct. 3, 2013

(30) Foreign Application Priority Data

Nov. 29, 2010 (KR) .................. 10-2010-0119759
Mar. 16, 2011 (KR) .................. 10-2011-0023490

(51) Int. Cl.
*H04N 19/00* (2014.01)
*H04N 19/50* (2014.01)
(Continued)

(52) U.S. Cl.
CPC ....... *H04N 19/00569* (2013.01); *H04N 19/11* (2014.11); *H04N 19/463* (2014.11)

(58) Field of Classification Search
None
See application file for complete search history.

(56) References Cited

U.S. PATENT DOCUMENTS 8,462,853 B2 6/2013 Jeon et al.
2005/0013497 A1* 1/2005 Hsu .................. H04N 19/52
382/239

(Continued)

FOREIGN PATENT DOCUMENTS

CN 101884219 A 11/2010
KR 1020070062146 6/2007

(Continued)

OTHER PUBLICATIONS

International Search Report mailed May 7, 2012 for PCT/KR2011/009080, citing the above reference(s).

*Primary Examiner* — Mohammed Rahaman
*Assistant Examiner* — Jimmy S Lee
(74) *Attorney, Agent, or Firm* — Hauptman Ham, LLP

(57) ABSTRACT

A video encoding apparatus encodes intra-prediction mode information of the current block by excluding information on overlapping or unnecessary intra-prediction modes from a candidate mode group and/or based on whether predicted values of intra-prediction modes of at least a preset number of subblocks are matched with actual intra-prediction modes.

3 Claims, 10 Drawing Sheets

(51) Int. Cl.
*H04N 19/11* (2014.01)
*H04N 19/463* (2014.01)

(56) References Cited

U.S. PATENT DOCUMENTS

2011/0286520 A1* 11/2011 Xu ..................... H04N 19/176
375/240.12
2013/0094584 A1* 4/2013 Kondo ............. H04N 19/00781
375/240.12

FOREIGN PATENT DOCUMENTS

| KR | 1020100081984 | 7/2010 |
| KR | 1020100121972 | 11/2010 |

* cited by examiner

| $z_9$ | $z_1$ | $z_2$ | $z_3$ | $z_4$ | $z_5$ | $z_6$ | $z_7$ | $z_8$ |
|---|---|---|---|---|---|---|---|---|
| a | | | | | | | | |
| b | | Current Block | | | | | | |
| c | | | | | | | | |
| d | | | | | | | | |

FIG. 5

| Number of Subblocks | Binarized Information |
|---|---|
| 16 | 0 |
| 15 | 10 |
| 14 | 110 |
| 13 | 111 |

*FIG. 6*

| Position of 2nd Subblock to be Binarized | Binarized Code |
|---|---|
| Upper Right 4×4 Subblock | 0 |
| Lower Left 4×4 Subblock | 10 |
| Lower Right 4×4 Subblock | 11 |

*FIG. 9*

METHOD AND APPARATUS FOR ENCODING/DECODING IMAGES TO MINIMIZE REDUNDANCY OF INTRA-PREDICTION MODE

CROSS-REFERENCE TO RELATED APPLICATION

The present application is the US national phase of International Patent Application No. PCT/KR2011/009080, filed Nov. 25, 2011, which claims priority to Korean Patent Application No. 10-2010-0119759, filed on Nov. 29, 2010 and Korean Patent Application No. 10-2011-0023490, filed on Mar. 16, 2011. The above-listed applications are hereby incorporated by reference herein in their entirety.

TECHNICAL FIELD

The present disclosure in one or more embodiments relates to a method and an apparatus for encoding/decoding video in an intra-prediction mode.

BACKGROUND

The statements in this section merely provide background information related to the present disclosure and may not constitute prior art.

Due to enormous data sizes, videos require a compressing process before storage or transmission. Typical encoding of the video data is performed by intra-predicting or inter-predicting, transforming, quantizing, and entropy-coding each picture of the video data in units of blocks. Particularly, the intra-prediction is performed to reduce redundancy of data in the video, and the redundancy of the data is reduced through the intra-prediction which performs the prediction from neighboring blocks by using spatial redundancy. At this time, the inventor(s) has/have noted that the compression capability may deteriorate due to unnecessary information or overlapping information included in intra-prediction mode information.

SUMMARY

Some embodiments of the present disclosure provide a video encoding apparatus including an intra-prediction encoder and a prediction mode encoder. The intra-prediction encoder is configured to encode a current block by intra-predicting the current block by using pixels of neighboring blocks adjacent to the current block. The prediction mode encoder is configured to encode intra-prediction mode information of the current block. When among the neighboring blocks adjacent to the current block there is an absent neighboring block which is not available for an intra-prediction mode, the prediction mode encoder is configured to encode the intra-prediction mode information of the current block by excluding the intra-prediction mode using a pixel of the absent neighboring block from a candidate mode group.

Some embodiments of the present disclosure provide a video encoding apparatus including an intra-prediction encoder and a prediction mode encoder. The intra-prediction encoder is configured to intra-prediction encode subblocks of a current block by using pixels of neighboring blocks adjacent to the subblocks. The prediction mode encoder is configured to encode intra-prediction mode information of the current block. The intra-prediction mode information includes a prediction mode single coding flag indicating whether predicted values of intra-prediction modes of at least a preset number of subblocks in the current block are matched with actual intra-prediction modes or not.

Some embodiments of the present disclosure provide a video decoding apparatus including a prediction mode decoder and an intra-prediction decoder. The prediction mode decoder is configured to exclude, when among neighboring blocks adjacent to a current block there is an absent neighboring block which is not available for an intra-prediction mode, the intra-prediction mode using a pixel of the absent neighboring block from a candidate mode group so as to reconstruct information on one or more intra-prediction modes of the current block from a bitstream. The intra-prediction decoder is configured to generate a predicted block of the current block, by using the reconstructed one or more intra-prediction modes, for reconstructing the current block.

Some embodiments of the present disclosure provide a video decoding apparatus including a prediction mode decoder and an intra-prediction decoder. The prediction mode decoder is configured to decode information on intra-prediction modes of subblocks of a current block to be reconstructed from a bitstream, and to reconstruct the intra-prediction modes based on a prediction mode single coding flag included in the information on the intra-prediction modes. The single coding flag indicates whether the predicted values of the intra-prediction modes of at least a preset number of subblocks are matched with actual intra-prediction modes or not. The intra-prediction decoder is configured to generate a predicted block of the current block, by using the reconstructed intra-prediction modes, for reconstructing the current block.

Some embodiments of the present disclosure provide a video decoding method performed by a video decoding apparatus. In the video decoding method, when among neighboring blocks adjacent to a current block there is an absent neighboring block which is not available for an intra-prediction mode, the intra-prediction mode using a pixel of the absent neighboring block is excluded from a candidate mode group so as to reconstruct information on one or more intra-prediction modes of the current block from a bitstream. The video decoding method further includes generating a predicted block of the current block by using the reconstructed one or more intra-prediction modes, and reconstructing the current block by using the predicted block.

Some embodiments of the present disclosure provide a video decoding method performed by a video decoding apparatus. In the video decoding method, information on intra-prediction modes of subblocks of a current block to be reconstructed is decoded from a bitstream. The intra-prediction modes are constructed based on a prediction mode single coding flag included in the information on the intra-prediction modes. The single coding flag indicates whether predicted values of the intra-prediction modes of at least a preset number of subblocks are matched with actual intra-prediction modes or not. The video decoding method further includes generating a predicted block of the current block by using the reconstructed intra-prediction modes, and reconstructing the current block by using the predicted block.

DESCRIPTION OF DRAWINGS

FIG. 5 is a diagram of an example where neighboring blocks used for predicting a current block have the nearly same pixel values;

FIG. 6 is a diagram of an exemplary table referred to by a prediction mode encoder when the encoder generates information on the number of subblocks of which most probable modes (MPMs) are matched with actual intra-prediction modes.

FIG. 9 is an exemplary diagram of a table for binarizing the positions of 4×4 subblocks.

DETAILED DESCRIPTION

Figure 1:
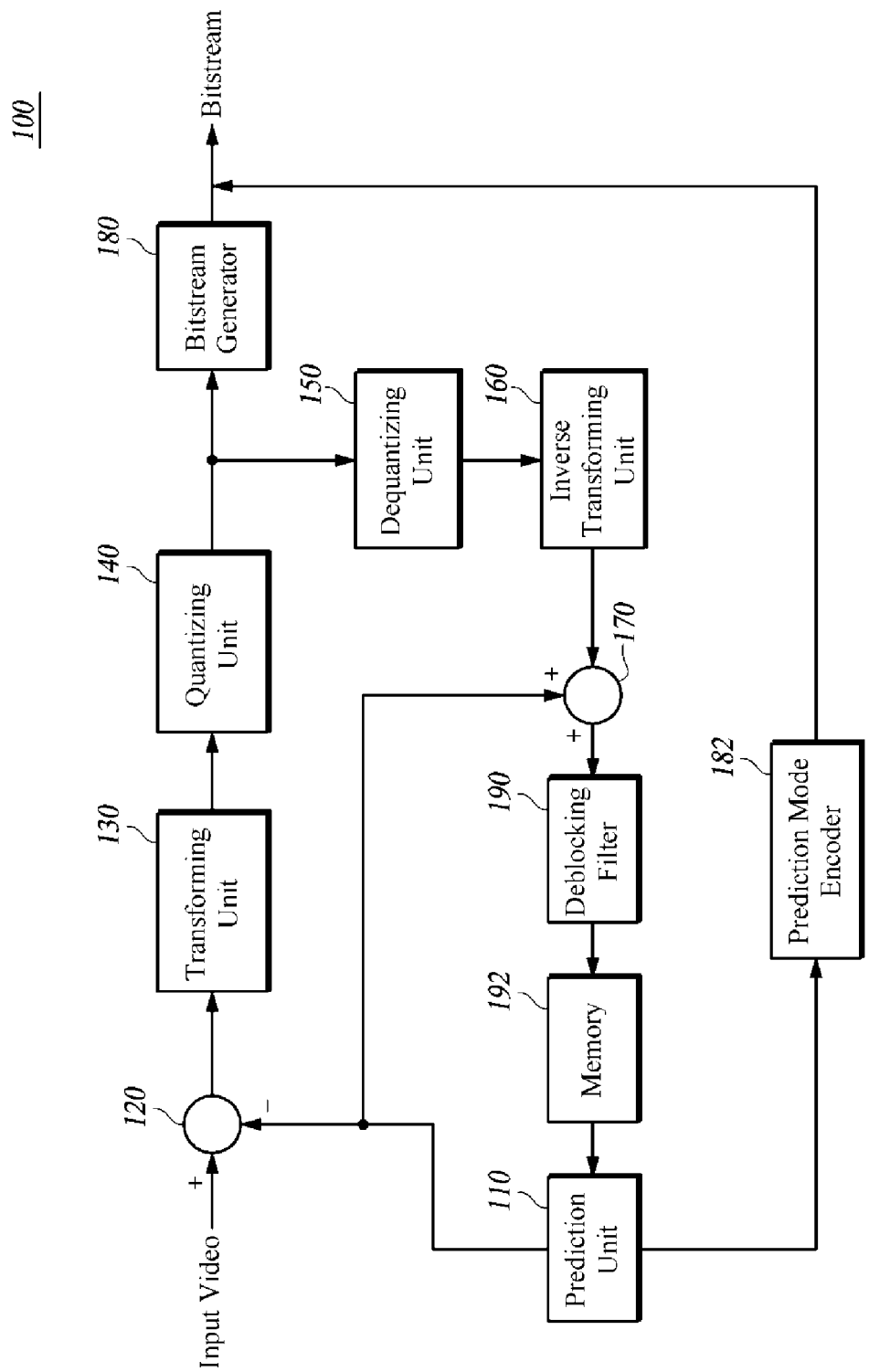
FIG. 1 is a schematic block diagram of a video encoding apparatus according to at least one embodiment of the present disclosure.

Some embodiments of the present disclosure improve a coding efficiency in a video encoding or decoding by reducing unnecessary or overlapping information included in intra-prediction mode information when the intra prediction mode information is encoded.

Hereinafter, a video encoding apparatus and a video decoding apparatus described below may be user terminals such as a personal computer (PC), a notebook computer, personal digital assistant (PDA), portable multimedia player (PMP), PlayStation Portable (PSP), wireless communication terminal, smart phone, TV and the like, or server terminals such as an application server, service server and the like, and may refer to various apparatuses including (i) a communication apparatus such as a communication modem and the like for performing communication with various types of devices or a wired/wireless communication network, (ii) a memory for storing various types of programs and data for encoding or decoding a video or performing an inter or intra prediction for the encoding or decoding, and (iii) a microprocessor and the like for executing the program to perform an operation and control. According to one or more embodiments, the memory comprises a computer-readable recording/storage medium such as a random access memory (RAM), a read only memory (ROM), a flash memory, an optical disk, a magnetic disk, a solid-state disk, and the like. According to one or more embodiments, the microprocessor is programmed for performing one or more of operations and/or functionality described herein. According to one or more embodiments, the microprocessor is implemented, in whole or in part, by specifically configured hardware (e.g., by one or more application specific integrated circuits or ASIC(s)).

Further, a video encoded into a bitstream by the video encoding apparatus may be transmitted in real time or non-real-time to the video decoding apparatus through wired/wireless communication networks such as the Internet, wireless personal area network (WPAN), wireless local area network (WLAN), WiBro (wireless broadband, aka WiMax) network, mobile communication network and the like or through various communication interfaces such as a cable, a universal serial bus (USB) and the like, and thus decoded in the video decoding apparatus and reconstructed and reproduced as the video.

A video typically may include a series of pictures (also referred to herein as "images" or "frames") each of which is divided into predetermined areas, such as blocks. When a frame of the video is partitioned into blocks, the partitioned blocks may be classified into an intra block or an inter block depending on an encoding method. The intra block means a block that is encoded through an intra prediction coding method which generates a predicted block by predicting a pixel of a current block using pixels of a reconstructed block that underwent previous encoding and decoding and then encodes a differential value between the predicted block and the pixel of the current block within a current picture (i.e., current frame) where the current encoding is performed. The inter block means a block that is encoded through an inter prediction encoding which generates the predicted block by predicting the current block in the current picture through referencing one or more past pictures or future pictures and then encoding the differential value of the predicted block from the current block. Here, the picture that is referenced in encoding or decoding the current picture is called a reference picture (or reference frame).

FIG. 1 is a block diagram schematically illustrating a video encoding apparatus 100 according to at least one embodiment of the present disclosure.

The video encoding apparatus 100 according to at least one embodiment of the present disclosure is an apparatus for encoding a video and may include an intra-prediction encoder and a prediction mode encoder 182. The intra-prediction encoder according to the present disclosure may include a prediction unit 110, a subtractor 120, a transforming unit 130, a quantizing unit 140, dequantizing unit 150, an inverse transforming unit 160, an adder 170, a bitstream generator 180, a deblocking filter 190, and a memory 192, and some of the above-listed components may not be included, or some or all of the components may be selectively included according to the implementation.

A video to be encoded is input in units of blocks, and the block may have an m×n form in the present disclosure, wherein m and n have various sizes and m and n are the same or different.

The prediction unit 110 generates a predicted block by predicting a target block to be currently encoded in a video by using an intra-prediction or inter-prediction scheme. That is, when the prediction unit 110 performs the intra-prediction, the prediction unit 110 generates the predicted block having a predicted pixel value of each pixel predicted by predicting a pixel value of each pixel of the target block to be encoded in the video based on a determined optimal prediction mode. Here, a prediction mode having the smallest encoding cost may be determined as the optimal prediction mode among various intra-prediction modes for the intra-prediction (for example, nine prediction modes in each of an intra 8×8 prediction and an intra 4×4 prediction and four prediction modes in an intra 16×16 prediction in H.264/AVC).

Figure 2:
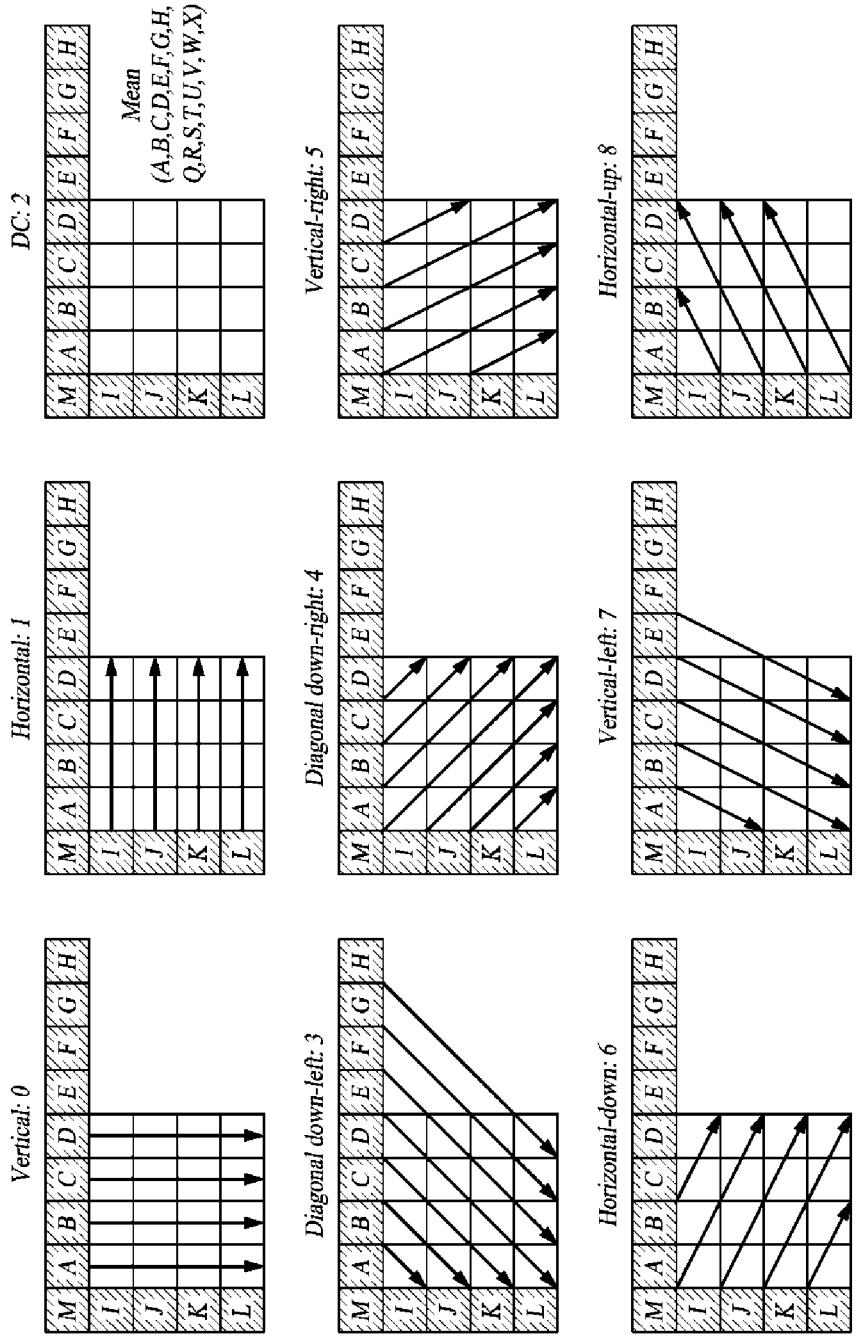
FIG. 2 is an exemplary diagram of an intra 4×4 prediction mode of H.264/AVC.

FIG. 2 is diagram illustrating an example of an intra 4×4 prediction mode of H.264/AVC. Referring to FIG. 2, the intra 4×4 prediction includes nine prediction modes, such as a vertical mode, a horizontal mode, a Direct Current (DC) mode, a diagonal down-left mode, a diagonal down-right mode, a vertical-right mode, a horizontal-down mode, a vertical-left mode, and a horizontal-up mode. The prediction unit 110 can calculate an encoding cost of each prediction mode according to a block mode or a block size of the target block and determine the prediction mode having the smallest encoding cost as the optimal intra-prediction mode.

The subtractor 120 generates a residual block by subtracting the predicted block from the target block to be encoded (that is, current block). That is, the subtractor 120 generates the residual block including a residual signal in a block form by calculating a difference between the pixel value of each pixel of the target block to be encoded and the predicted pixel value of each pixel of the predicted block predicted by the prediction unit 110.

The transforming unit 130 transforms each pixel value of the residual block to a frequency coefficient by transforming the residual block to a frequency domain. Here, the transforming unit 130 can transform the residual signal to the frequency domain by using various transform schemes which transform an image signal on a spatial axis to a component on a frequency axis, such as a Hadamard transform, a discrete cosine transform (DCT) based transform and the like, and the residual signal transformed to the frequency domain becomes the frequency coefficient.

The quantizing unit 140 quantizes the frequency coefficient which is generated by transforming the residual block to the frequency domain by the transforming unit 130. Here, the quantizing unit 140 can quantize the transformed residual block by using a Dead Zone Uniform Threshold Quantization (hereinafter, referred to as "DZUTQ"), a quantization weighted matrix, an improved quantization scheme thereof or the like.

The bitstream generator 180 outputs a bitstream by encoding a quantized frequency coefficient stream by using an entropy-coding scheme or the like. An entropy encoding technology may be used as the coding technology, but the present disclosure is not limited thereto and can use various coding technologies.

In addition, the bitstream generator 180 can insert not only the bitstream encoded from the quantized frequency coefficients but also various pieces of information required for decoding the encoded bitstream into encoded data. That is, the encoded data may include a coded block pattern (CBP), a delta quantization parameter, a bitstream generated by encoding the quantized frequency coefficient, a bitstream for information required for the prediction and the like.

The dequantizing unit 150 inversely quantizes or dequantizes the frequency transform block quantized by the quantizing unit 140. That is, the dequantizing unit 150 generates the residual block having the frequency coefficient by dequantizing the quantized frequency coefficients of the quantized residual block.

The inverse transforming unit 160 inversely transforms the residual block dequantized by the inverse quantizing unit 150. Specifically, the inverse transforming unit 160 generates the residual block having the pixel value, that is, the reconstructed residual block by inversely transforming the frequency coefficients of the dequantized residual block. Here, the inverse transforming unit 160 can perform the inverse transform by inversely performing the transform scheme used by the transforming unit 130.

The adder 170 reconstructs the current block, that is the target block by adding the predicted block predicted by the prediction unit 110 and the residual block reconstructed by the inverse transforming unit 160. The reconstructed target block passes through the deblocking filter 190. The deblocking filter 190 removes block distortion and like by deblocking-filtering the reconstructed current block, and the memory 192 stores the deblocking-filtered current block so that the current block can be used as a reference picture when a next block of the target block is encoded or another block is encoded in the future.

The prediction mode encoder 182 encodes information on the intra-prediction mode. The prediction mode encoder 182 may be implemented as a module separated from the bitstream generator 180, or combined with the bitstream generator 180 to be implemented as one module.

Figure 3:
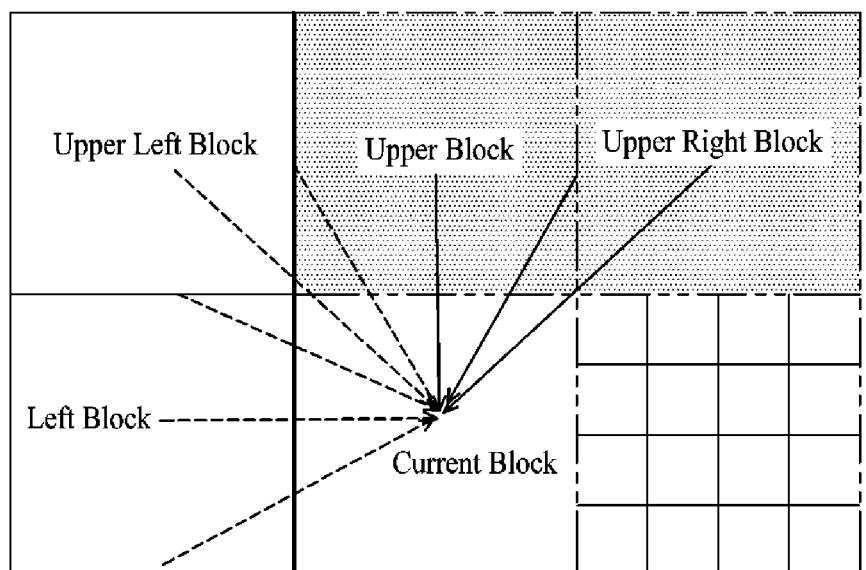
FIG. 3 is an exemplary diagram of a usable intra prediction mode and an unusable intra prediction mode of a block located at a picture boundary.

FIG. 3 is diagram illustrating an example of a usable intra-prediction mode and an unusable intra-prediction mode of a block located at a picture boundary. In FIG. 3, a bold unbroken straight line indicates a picture boundary, and a dotted straight line indicates a block boundary. Since a left block and an upper left block of the current block located at the picture boundary are not available and cannot be used for the intra-prediction, an unbroken arrow indicates a usable prediction mode, and a dotted arrow indicates an unusable prediction mode.

The current block is predicted by using pixels of neighboring blocks of the current block. When some prediction modes find no corresponding neighboring blocks or find unusable neighboring blocks, the intra-prediction mode in the corresponding directions cannot be used. In this case, generating intra-prediction mode information with the corresponding prediction mode inserted into a candidate mode group results in adding an unnecessary bit.

When, among the neighboring blocks adjacent to the current block, there is an absent neighboring block which is not available or cannot be used for an intra-prediction mode, the prediction mode encoder 182 can encode information on the intra-prediction mode (or intra-prediction mode information) of the current block by excluding the intra-prediction mode using a pixel of the absent neighboring block from a candidate mode group, i.e., a group of intra-prediction modes to be included in the encoded intra-prediction mode information of the current block. In other words, the prediction mode encoder 182 does not encode information on the intra-prediction mode(s) using pixel(s) of the absent neighboring block(s). In particular, since the current block to be encoded is located at the picture boundary as illustrated in FIG. 3, when there is a neighboring block which does not exist (that is, an absent neighboring block, for example, the left block and the upper left block in FIG. 3) or there is a block which cannot be used for the intra-prediction among the neighboring blocks as described above, the intra-prediction mode in the corresponding direction cannot be used. In FIG. 3, there are no left block and upper left block of the current block, and therefore only the vertical mode, the diagonal down-left mode, the vertical-left mode and the DC mode can be used, whereas the horizontal mode, the diagonal down-right mode, the vertical-right mode, the horizontal-down mode and the horizontal-up mode cannot be used. However, generating the intra-prediction mode information with even the unusable prediction modes included in the candidate mode group will cause unnecessary extra bits added to the intra-prediction mode information.

Accordingly, in the case of FIG. 3, the prediction mode encoder 182 can take just four usable prediction modes in generating the intra-prediction mode information, enabling the intra-prediction modes to be encoded by using fewer bits. Then, the neighboring blocks are checked for their status, and if the presence of at least one unusable prediction mode is confirmed, the corresponding prediction modes are excluded (but maintaining the remaining usable prediction modes) from the candidate mode group for generating the intra-prediction mode information, whereby improving the encoding efficiency. For example, in such codec scheme as H.264/AVC, the prediction mode of the current block is predicted by using modes of the left block and the upper block. At this time, the encoding is performed by using 1 bit when a predicted value is matched with an actual predicted mode, and performed by using 4 bits when the predicted value is not matched with the actual predicted mode. However, in the case of FIG. 3, when the prediction mode of the current block is predicted by using modes of the left block and the upper block according to the present disclosure, the encoding is performed by using 1 bit when the predicted value is matched with the actual prediction mode, and performed by using only 3 bits when the predicted value is not matched with the actual predicted mode, and therefore the encoding efficiency can be increased. The present embodiment is an example with H.264/AVC, but the present disclosure is not limited to this event of the prediction mode set as present in H.264/AVC.

Figure 4:
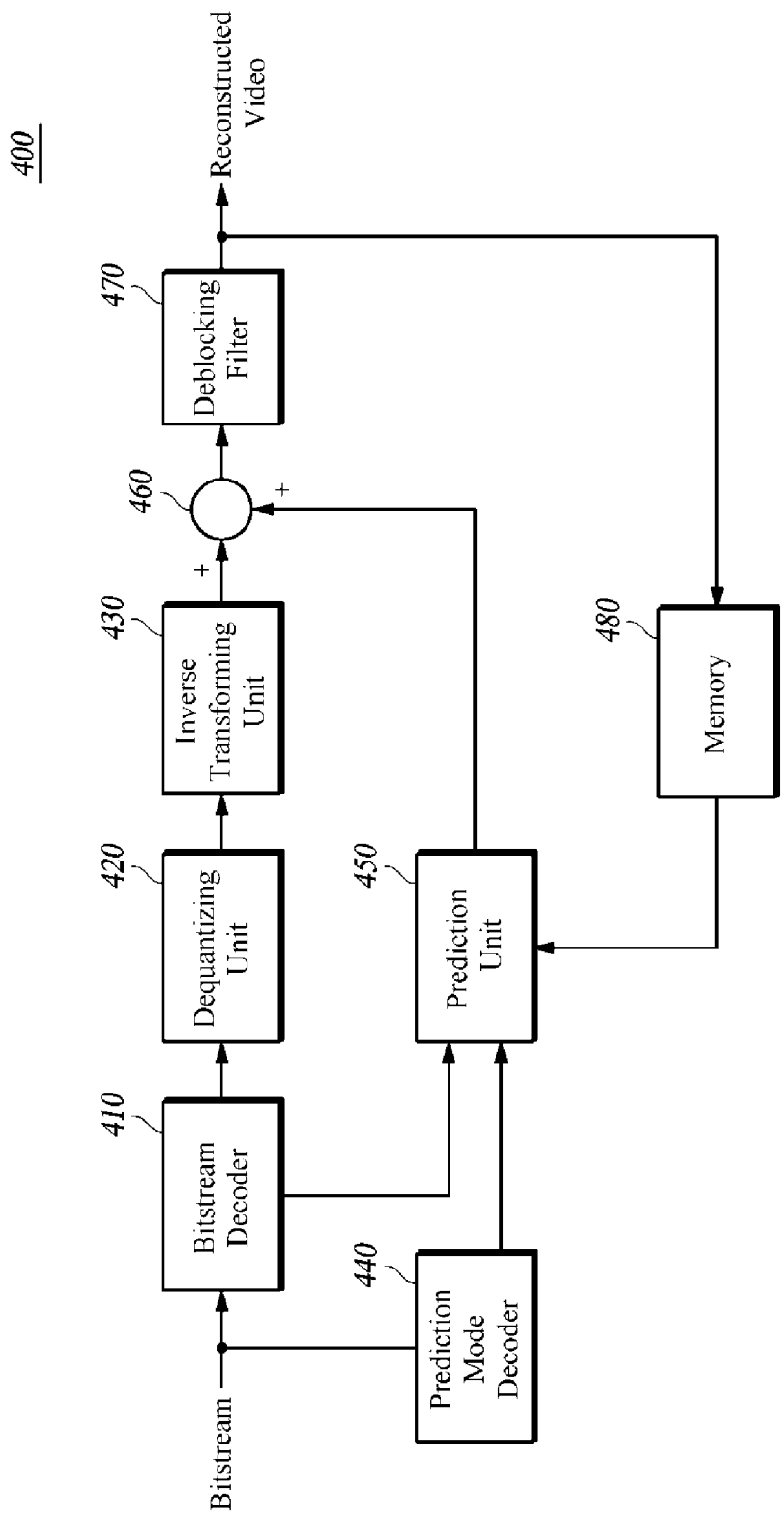
FIG. 4 is a schematic block diagram of a configuration of a video decoding apparatus according to at least one embodiment of the present disclosure.

FIG. 4 is a block diagram for schematically illustrating a configuration of a video decoding apparatus 400 according to at least one embodiment of the present disclosure.

The video decoding apparatus 400 according to at least one embodiment of the present disclosure includes an intra-prediction decoder and a prediction mode decoder 440. Here, the intra-prediction decoder according to the present disclosure may include a bitstream decoder 410, a dequantizing unit 420, an inverse transforming unit 430, a prediction unit 450, an adder 460, a deblocking filter 470, and a memory 480, and some of the above-listed components may not be included, or some or all of the components may be selectively included according to the implementation.

The video decoding apparatus 400 may include the bitstream decoder 410, the dequantizing unit 420, the inverse transforming unit 430, a prediction mode decoder 440, the prediction unit 450, the adder 460, the deblocking filter 470, and the memory 480. Meanwhile, the intra-prediction decoder according to the present disclosure may include the bitstream decoder 410, the dequantizing unit 420, the inverse transforming unit 430, the prediction unit 450, the adder 460, the deblocking filter 470, and the memory 480.

The bitstream decoder 410 can generate a block having a quantized frequency coefficient by extracting a quantized frequency coefficient stream by decoding a bitstream and inversely scanning the quantized frequency coefficient stream.

The dequantizing unit 420 reconstructs a frequency coefficient block by dequantizing the quantized frequency coefficient decoded by the bitstream decoder 410.

The inverse transforming unit 430 reconstructs a residual block by inversely transforming the frequency coefficient block reconstructed by the dequantizing unit 420.

Since the dequantizing unit 420 and the inverse transforming unit 430 perform the same or similar functions to those of the dequantizing unit 150 and the inverse transforming unit 160 described through FIG. 1, respectively, detailed descriptions thereof will be omitted.

The prediction mode decoder 440 decodes information on the intra-prediction mode from the bitstream. The prediction mode decoder 440 may be implemented as a module separated from the bitstream decoder 410, or may be combined with the bitstream decoder 410 to be implemented as one module.

The prediction unit 450 generates a predicted block by using pixels of neighboring blocks adjacent to the current block and information on the intra-prediction mode extracted from the prediction mode decoder 440.

The adder 460 reconstructs a target block by adding the predicted block generated by the prediction unit 450 and the residual block reconstructed by the inverse transforming unit 430. The reconstructed target block is deblocking-filtered by the deblocking filter 470 and then stored in the memory 480, and can be used as a reference picture when a next block of the target block is reconstructed or another block is reconstructed in the future.

Meanwhile, when there is an absent neighboring block which cannot be used for the intra-prediction among neighboring blocks including pixels used for the intra-prediction mode, the prediction mode decoder 440 can decode information on the intra-prediction mode from the bitstream by excluding the intra-prediction mode using pixels of the absent neighboring block from the candidate mode group. In other words, as illustrated in FIG. 3, when only four intra-prediction modes are available for use, for example, in a case of the codec such as H.264/AVC, the prediction mode decoder 440 decodes one bit information for indicating whether a predicted MPM (Most Probable Mode) that is the intra-prediction mode of the current block determined from intra-prediction modes of the neighboring blocks matches or unmatches with an actual intra-prediction mode, wherein the MPM is predicted as an intra-prediction mode which has a lowest intra-prediction mode value among intra-prediction modes of the neighboring blocks of the current block. When the one-bit information indicates that the MPM is matched with the actual prediction mode, the intra-prediction mode of the current block is determined from the intra-prediction modes of the neighboring blocks. In the case where the one-bit information indicates that the MPM is not matched with the actual prediction mode, e.g., when the current block is located in the position as illustrated in FIG. 3, the intra-prediction mode can be reconstructed among currently available intra-prediction modes by identifying that only four intra-prediction modes (including the DC mode) can be used and decoding only 3 bits from the bitstream with the intra-prediction mode.

Figure 5:
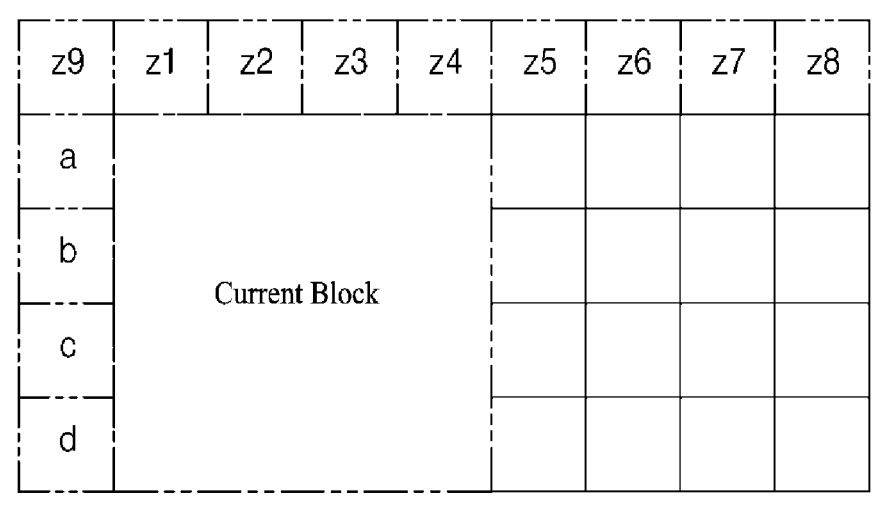

FIG. 5 is a diagram illustrating an example where neighboring blocks used for predicting a current block have nearly the same pixel values.

In the video encoding apparatus 100 according to at least one embodiment of the present disclosure, the prediction mode encoder 182 can encode information on the intra-prediction mode of the current block by unifying all intra-prediction modes using only pixels having similar values among pixels used for the intra-prediction mode and inserting the unified mode into a candidate mode group.

When pixel values of the neighboring blocks used for predicting the current block have similar values, information on the intra-prediction mode can be reduced, thereby increasing an encoding efficiency. For example, as illustrated in FIG. 5, when z1 to z9 are configured to have nearly the same value (or the same value), since predicted blocks generated by using intra-prediction modes after using pixels of an upper left block, an upper block and an upper right block of the current block may have predicted signals of nearly the same value, the intra-prediction modes have overlapping prediction mode characteristics. Accordingly, by inserting only one of the prediction modes predicted from the pixels of the neighboring blocks having nearly the same value into a candidate mode group, the possible redundancy in predicting the prediction of the intra-prediction mode information can be removed.

Accordingly, in a case of FIG. 5, the vertical mode, the diagonal-left mode, the vertical-left mode and the like have similar predicted results, so that they can be unified and represented as one mode. In other words, seven modes, not nine modes, can be encoded as the candidate mode group.

Here, whether the pixel values of the neighboring blocks used for predicting the current block have the similar (or nearly the same) values may be determined based on at least one neighboring block similarity from the similarity between neighboring pixels of the left block of the current block, the similarity between neighboring pixels of the left block, upper left block and upper block of the current block, the similarity between neighboring pixels of the upper block and upper right block of the current block and the like, but the present disclosure is not limited thereto. Here, the similarity/nonsimilarity determination is achieved by using a statistical average characteristic of the adjacent pixels, for example, by determining whether a variance value of the adjacent pixels is equal to or smaller than a predetermined value, but the inter pixel similarity/nonsimilarity determination is not limited to the method using the variance and may use various methods including a method of determining equal or smaller inter pixel differences than a predetermined value.

For example, when it is determined that there is the similarity among adjacent pixels (a to d, z1 to z4 and z9) of the left block, upper left block and upper block of the current block, a mode unification can be performed on the vertical mode, horizontal mode, diagonal-right mode, vertical-right mode, horizontal-down mode, horizontal-up mode and the like and the unified mode can be inserted into the candidate group of the prediction mode to be encoded. Accordingly, the encoding is performed only with the four modes including the DC mode, diagonal-left mode, vertical-left mode and unified mode, thereby reducing the number of encoding bits of the intra-prediction mode.

As stated above, when such codec scheme as H.264/AVC predicts the prediction mode of the current block by using the prediction modes of the left block and the upper block of the current block, the encoding is performed by using 1 bit when the predicted value is matched with the actual prediction mode, and performed by using 4 bits when the predicted value is not matched with the actual prediction mode. However, in the present disclosure, the prediction mode of the current block is predicted by using modes of the left block and the upper block, and the encoding is performed by using 1 bit when the predicted value is matched with the actual prediction mode and performed by totally using only 3 bits (2 bits of which are for encoding the four modes) when the predicted value does not match the actual prediction mode, thereby increasing the encoding efficiency.

As described above, when the prediction mode encoder 182 encodes information on the intra-prediction mode of the current block by unifying all intra-prediction modes using only pixels having similar values among pixels used for the intra-prediction modes and inserting the combined one mode into the candidate mode group, the prediction mode decoder 440 of the video decoding apparatus 400 can reconstruct the intra-prediction mode by the number of required bits from the bitstream by unifying all intra-prediction modes using only pixels having similar values among pixels used for the intra-prediction modes through identification of pixel values of the neighboring blocks and inserting the unified mode into the candidate mode group.

Meanwhile, the prediction mode encoder 182 can encode intra-prediction mode information including a prediction mode single coding flag which indicates whether the prediction values of intra-prediction modes of at least a preset number of subblocks within the target block to encode are matched with actual intra-prediction modes.

As described above, when there are more cases of predicting the intra-prediction modes of the current block to match the actual intra-prediction mode, the encoding efficiency can be increased. For example, in H.264/AVC, the encoding is performed by using one bit when predicting the intra-prediction mode of the current block by using prediction modes of the upper block and the left block of the current block to match the actual intra-prediction mode, and the encoding is performed by using four bits when the predicted intra-prediction mode is not matched with the actual intra-prediction mode.

It is assumed that there are M subblocks within the target block and there are N cases (i.e., subblocks) where the mode of the current block predicted using intra-prediction modes of the neighboring blocks is matched with the actual intra-prediction mode. When A is the number of bits used when the predicted intra-prediction mode of the current block is matched with the actual intra-prediction mode and B is the number of bits used when the predicted intra-prediction mode of the current block is not matched with the actual intra-prediction mode, $N*A+(M-N)*B$ bits are used for the intra-prediction mode information in the current block. As N increases and thus approaches M, a smaller number of bits is used for the intra-prediction mode information of the current block. However, as N increases, overlapping bits are increasingly included. When N is M, M (or N) bits are used (assuming A is 1) for encoding the intra-prediction mode information. For example, in H.264/AVC and in case of the intra 4×4, when the prediction is accurately performed on all intra-prediction modes of sixteen subblocks (M=16), sixteen bits are used for the intra-prediction mode information of the current block.

Accordingly, the present disclosure provides a method of transmitting pieces of intra-prediction mode information en bloc in order to remove redundancy of intra-prediction mode information predicted in the target block. As a result of predicting intra-prediction modes of the preset number (or more) of subblocks among M subblocks within the target block by using left block and upper block thereof, when the predicted intra-prediction mode is identical to the actual intra-prediction mode, intra-prediction mode information including the prediction mode single coding flag is transmitted, instead of transmitting the intra-prediction mode information to every subblock. The prediction mode single coding flag indicates whether the preset number (or more) of blocks among the M subblocks within the target block are matched with the actual modes.

Along with the prediction mode single coding flag, included in the intra-prediction mode information to be encoded are information of the number and positions of subblocks of which predicted values of intra-prediction modes are not matched with actual intra-prediction modes as well as information on the actual intra-prediction mode, and thereby the intra-prediction mode information can be reduced and the encoding can be efficiently performed. As a result of predicting intra-prediction modes of the M subblocks, when there are smaller than preset number of cases where the predicted intra-prediction mode is matched with the actual intra-prediction mode, encoding is performed on a prediction mode single coding flag which indicates encoding by the conventional method (that is, encoding the intra-prediction mode for each subblock).

Particularly, when a quantization parameter is large (that is, at a low bit rate), a ratio of the intra-prediction mode information to totally generated bits is high. Accordingly, by reducing overlapping intra prediction mode information, the high encoding efficiency can be obtained.

As described above, when the prediction mode encoder 182 encodes the intra-prediction mode information including the prediction mode single coding flag indicating whether the predicted values of the intra-prediction modes of at least the preset number of subblocks within the target blocks to encode are matched with the actual intra-prediction mode, the prediction mode decoder 440 of the video decoding apparatus 400 can decode the intra-prediction mode information of the subblock of the current block to be reconstructed from the bitstream and can reconstruct the intra-prediction mode based on whether the prediction mode single coding flag included in the intra-prediction mode information means to indicate that the predicted value of the intra-prediction mode of the preset number of subblocks is matched with the actual intra-prediction mode. Here, information on the preset number may be mutually agreed between the video encoding apparatus and the video decoding apparatus, or may be transmitted by the video encoding apparatus to the video decoding apparatus in units of sequences, slices of the video or the like.

Accordingly, when the prediction mode single coding flag indicates that predicted values of the intra-prediction modes of at least the preset number of subblocks are matched with the actual intra-prediction modes, the prediction mode decoder 440 can reconstruct the intra-prediction modes of all subblocks by decoding the number of subblocks of which the predicted values of the intra-prediction modes are not matched with the actual intra-prediction modes included in the intra-prediction mode information, positions of the subblocks, and information on the actual intra-prediction modes.

Further, when the prediction mode single coding flag indicates that the predicted values of the intra-prediction modes of at least the preset number of subblocks are not matched with the actual intra-prediction modes, the prediction mode decoder 440 can reconstruct the intra-prediction modes of all subblocks by decoding the intra-prediction mode for each subblock included in the intra-prediction mode information.

FIG. 6 is a diagram illustrating an example of a table referred to when the prediction mode encoder 182 generates information on the number of subblocks of which most probable modes (MPMs) are matched with actual intra-prediction modes.

For example, in case where the intra 4×4 prediction is performed in the 16×16 block to generate information on the intra-prediction mode, to have information on thirteen or more subblocks generated among sixteen subblocks, various methods are used are to allocate bits to each piece of information. For example, referring to the table of FIG. 6, 0 is generated when there are sixteen subblocks of which the MPMs are equal (or matched) to the actual intra-prediction modes, a binarized code "1 0" is generated when the number of subblocks is fifteen, a binarized code "1 1 0" is generated when the number of subblocks is fourteen, and a binarized code "1 1 1" is generated when the number of subblocks is thirteen.

Further, a tree can be used for generating information on the positions of the subblocks of which the MPMs are not matched with the actual intra-prediction modes, thereby increasing the encoding efficiency.

For example, when sixteen subblocks sized 4×4 are assumed to be present in a block, also referred to herein as macroblock (MB), sized 16×16, suppose that a preset value of 13 is a reference point for using the method according to the present disclosure. If the MPMs of 14 subblocks in an MB are matched with the actual prediction modes and the MPMs of the remaining 2 subblocks are not matched with the actual prediction modes in one macroblock, which represents that the 14 subblocks have the MPMs matching with the actual prediction modes, then the presently disclosed method involves in encoding the intra-prediction mode. At this time, information on the position can be binarized and encoded by way of tree-based transmission.

Figure 7:
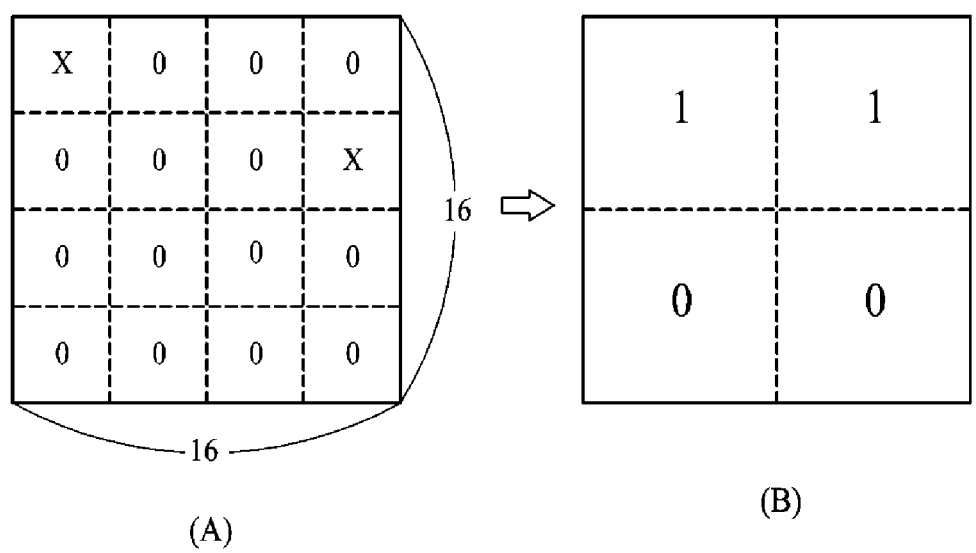
FIG. 7 is an exemplary diagram illustrating whether prediction modes of some subblocks match with MPMs or not within a macroblock in an intra 4×4 prediction.

FIG. 7 is a diagram illustrating an example of showing prediction modes of subblocks which are matched with the MPM or not within the macroblock in the intra 4×4 prediction.

With respect to the current block, the prediction mode encoder 182 generates information on whether there is an intra-prediction subblock of which the MPM is not matched with the actual prediction mode in four lower level (i.e., first order) subblocks having a ½ size of the current block by both length and width. With respect to lower level (i.e., first order) subblocks also, if second order subblocks having a ¼ size of the current block (in both length and width) are larger than the intra-prediction unit (i.e., 4×4), information is generated in a quad tree form for sequentially indicating whether the second order subblocks have an intra-prediction subblock of which the MPM is not matched with the actual prediction mode.

As illustrated in FIG. 7 at A, when the MPM is not matched with the actual prediction mode at two (second order) subblock positions (marked X), information on the corresponding subblocks is generated. When the tree (for example, quad tree) is used, the macroblock (16×16) is divided into four first order subblocks (8×8) each having a ½ size of the corresponding macroblock in both the length and width. In a raster scan order, 1 is allocated to a first order subblock with a second order subblock (4×4) of which the MPM is not matched with the actual prediction mode as illustrated in FIG. 7 at B. To a first order subblock with no second order subblock of which the MPM is not matched with the actual prediction mode (marked 0), 0 is allocated (allocations of 0 and 1 may be inversely performed in at least one embodiment). In this way, binary information "1 1 0 0" is generated, for example.

Since the prediction mode encoder 182 generates information on the number of subblocks of which the MPMs are not matched with the actual prediction modes with reference to the table of FIG. 6, it can be known through binary information of "1 1 0 0" generated in the case of FIG. 7 that the number of subblocks of which the MPMs are not matched with the actual prediction modes in each of the 8×8 blocks indicated by 1 is one. Accordingly, in the 8×8 block having the value of 1, information on the position of the one 4×4 block of which the MPM is not matched with the actual prediction mode within the 8×8 block can be generated by additionally using two bits. In FIGS. 7A and 7B, position information of a total of eight bits is generated. The eight bits are generated by adding four bits, each bit being allocated to each of the 8×8 blocks, and position information of four bits, each two bits being allocated to the 4×4 block within the 8×8 block of which the MPM is not matched with the actual prediction mode. The number of bits is equal to the number of bits in the case where information on two positions of the 4×4 blocks within the 16×16 block is transmitted. As illustrated in FIGS. 7A and 7B, when MPMs of fourteen subblocks are matched with the actual prediction modes, MPMs of two subblocks are not matched with the actual prediction modes. Accordingly, when MPMs of a first 8×8 block and a second 8×8 block are not matched with the actual prediction modes, the binary information of "1 1 0 0" can be reduced to binary information of "1 1" (since information indicating that MPMs of only two subblocks are not matched with the actual prediction modes can be known in advance as illustrated in FIG. 6, when the first and second 8×8 blocks correspond to a binary code "1 1", third and fourth 8×8 blocks naturally correspond to a binary code "0 0", thereby omitting two bits "0 0").

Figure 8:
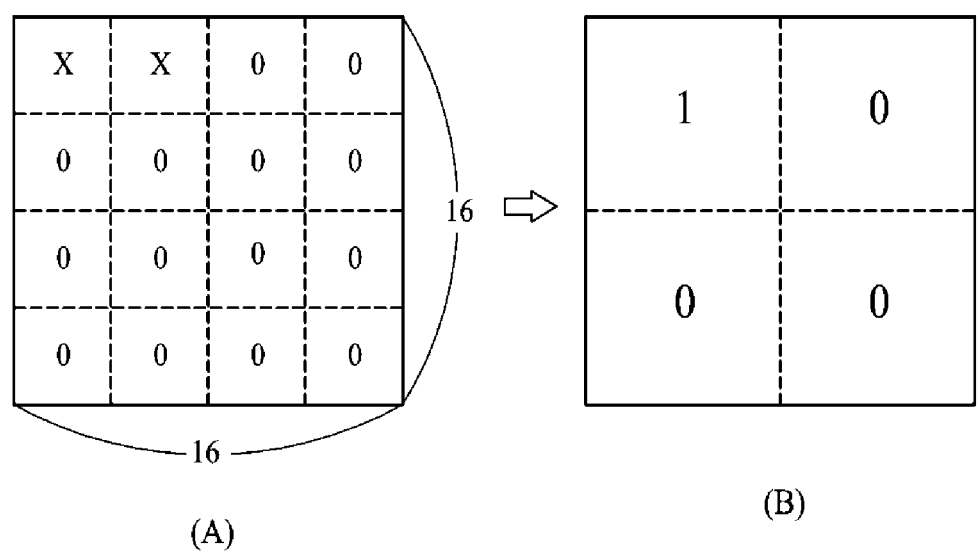
FIG. 8 is another exemplary diagram illustrating whether prediction modes of some subblocks match with MPMs or not within a macroblock in an intra 4×4 prediction.

FIG. 8 is a diagram for showing another example illustrating prediction modes of subblocks which are matched with the MPM or not within the macroblock in the intra 4×4 prediction.

As illustrated in FIG. 8 at A, in the case where there are 4×4 subblocks of which MPMs are matched with actual prediction modes within the macroblock in the intra 4×4 prediction, when information on blocks of which MPMs are not matched with intra 4×4 prediction mode information is generated in units of 8×8 blocks by using the quad tree in the same way used in FIG. 7, binary information of "1 0 0 0" is generated as illustrated in FIG. 8 at B. It means that positions of two 4×4 subblocks of which the MPMs are not matched with the actual prediction modes are included in one 8×8 block. Accordingly, in the first 8×8 block, position information of the 4×4 subblock of which the MPM is not matched with the actual prediction mode is generated by using two bits. And then, in the same 8×8 block, position information of the other 4×4 subblock of which the MPM is not matched with the actual prediction mode is transmitted by using two bits.

A position of each subblock can be binarized. For example, FIG. 9 is a diagram illustrating an example of a table in which positions of 4×4 subblocks are binarized.

In FIG. 8, one 4×4 subblock (for example, first upper left subblock) of which the MPM is not matched with the actual prediction mode can be presented by position information using two bits, and there remains a candidate group including three 4×4 subblocks in the corresponding 8×8 block except for the upper left subblock. Accordingly, position information of the remaining (second) subblock of which the MPM is not matched with the actual prediction mode may be binarized as illustrated in FIG. 9.

That is, as illustrated in FIG. 9, when the other (second) 4×4 subblock of which the MPM is not matched with the actual prediction mode corresponds to an upper right 4×4 subblock, only one bit of "0" is transmitted instead of the conventional two bits, so that the number of bits required for encoding position information of the other subblock of which the MPM is not matched with the actual prediction mode can be reduced.

Figure 10:
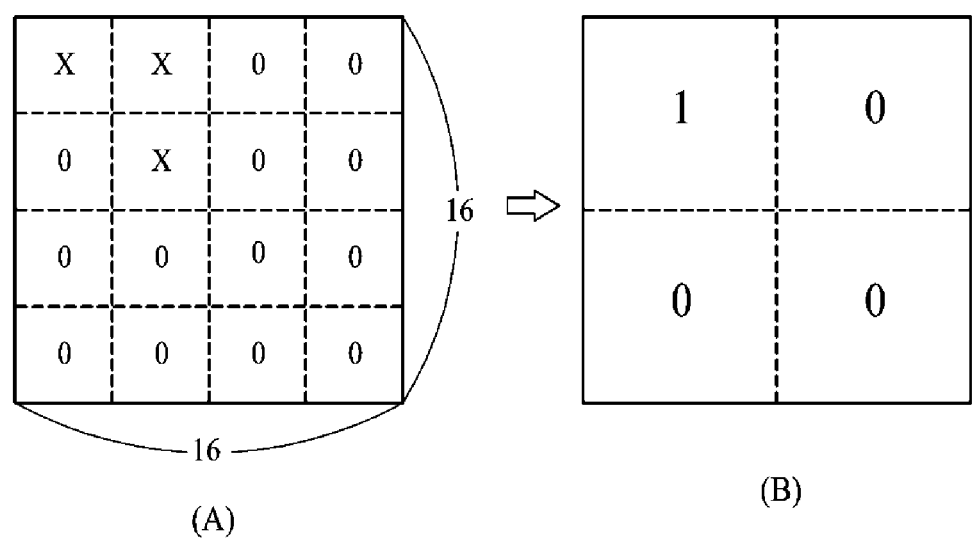
FIG. 10 is yet another exemplary diagram illustrating whether prediction modes of some subblocks match with MPMs or not within a macroblock in an intra 4×4 prediction.

FIG. 10 is a diagram illustrating still another example of showing prediction modes of subblocks which are matched with MPMs or not within the macroblock in the intra 4×4 prediction.

In the case where a size of a lower level (e.g., second order) subblock is equal to an intra-prediction unit, only information of a position of the subblock of which the MPM is not matched with the actual prediction mode is generated when there is one piece of information indicating that the MPM is not matched with the actual prediction mode, and only information on a position of the subblock of which the MPM is matched with the actual prediction mode is generated when there are three pieces of information indicating the MPM is not matched with the actual prediction mode.

For example, when thirteen MPMs are matched with actual prediction modes, preset thirteen or more MPMs are matched with actual prediction modes, and therefore the intra-prediction modes can be encoded by using the suggested method.

As illustrated in FIG. 10 at A, when the MPM is matched with the actual prediction mode, binary bits of "1 0 0 0" can be generated in a quad tree form as illustrated in FIG. 10 at B.

In FIG. 10, there are three 4×4 subblocks of which MPMs are not matched with actual prediction modes. Through binary information of "1 0 0 0" indicated by the quad tree, it can be known that there are three 4×4 subblocks of which MPMs are not matched with actual prediction modes in a first 8×8 block. In this case, since it is known in advance that MPMs of thirteen subblocks are matched with the actual prediction modes, MPMs of the subblocks within the macroblock which are matched with the actual prediction modes can be identified with six bits generated by adding four bits (i.e., "1 0 0 0") and two bits of position information of the one 4×4 subblock of which the MPM is matched with the actual prediction mode within the first 8×8 block to the quad tree, which provides efficiency.

Meanwhile, in the description of the quad tree according to at least one embodiment, the position information of the subblock of the 4×4 size is generated in the block of the 16×16 size, but the present disclosure is not limited thereto. In generating position information of the subblock of the 4×4 size in the block of the 32×32 size, 4 bit information indicating whether there is a subblock of the 4×4 size of which the MPM is matched with the actual prediction mode within a sub-area of the 16×16 size is generated. And then, with respect to the block (or sub-area) of the 16×16 size in which there is a subblock of the 4×4 size of which the MPM is not matched with the actual prediction mode, 4 bit information indicating whether there is a subblock of the 4×4 size of which the MPM is matched with the actual prediction mode within the subarea having the 8×8 size is generated. In the block having subblocks of which sizes are equal to the intra-prediction unit, the position information is not generated with the quad tree any more, but information on the position of the subblock (subblock of the intra-prediction unit) of which the MPM is not matched with the actual prediction mode is generated by using a table of FIG. 9. In the above example, although only the subblock of the 4×4 size has been described, the intra-prediction unit size may be set as various sizes as well as the 4×4 size.

As described above, when the prediction mode encoder 182 generates information on the actual intra-prediction mode in a quad tree form so as to encode the intra-prediction mode, the prediction mode decoder 440 of the video decoding apparatus 400 can extract the information on the intra-prediction mode by inversely using the method through which the prediction mode encoder 182 generates the information on the actual intra-prediction mode in the quad tree form from the bitstream. For example, if is assumed that the bitstream is encoded by performing the 4×4 intra-prediction and a size of the macroblock is 16×16, when a binarized code "1 1 0" is extracted from the bitstream as information on the number of subblocks of which MPMs are matched with the actual prediction modes (referred to as matching subblocks), the number 14 (fourteen) of matching subblocks is decoded by using the table of FIG. 6. Accordingly, it can be known that the number of subblocks (non-matching subblocks) of which MPMs are not matched with the actual prediction modes is two. Further, when a binarized code "1 0 0 0" is further decoded from the bitstream as information on positions of the non-matching subblocks, it can be known that the upper left 8×8 subblock of the 16×16 block includes the non-matching subblocks. In addition, when a binarized code "0 0" is further decoded from the bitstream, a position of a first non-matching subblock can be known through decoded information (when it is arranged to perform the encoding clockwise with respect to the position of the upper left subblock in an order of binarized codes "0 0", "0 1", "1 0", and "1 1", it is known that the decoded binarized code "0 0" means that the position of the first non-matching subblock corresponds to the upper left 4×4 subblock within an 8×8 upper left block setoff the 16×16 macroblock). Further, in the case where the further decoded information from the bitstream is "0", when it is arranged with the video encoding apparatus to use a binary table of FIG. 9 for information on the position of the second non-matching 4×4 subblock, it can be known that the position of the second non-matching 4×4 subblock corresponds to the upper right 4×4 subblock within the upper left 8×8 block as illustrated in FIG. 8.

Further, in the case where information on the actual intra-prediction mode is reconstructed by using the quad tree, when the number of cases (e.g., 4×4 subblocks) where the MPM is not matched with the actual prediction mode in the lowest level block (e.g., first order block of 8×8) is one or three, information on positions of subblocks of which MPMs are not matched with actual prediction modes can be reconstructed from the bitstream by using 1 bit information.

The video encoding/decoding apparatus according to at least one embodiment of the present disclosure can be implemented by connecting a bitstream output terminal of the video encoding apparatus of FIG. 1 to a bitstream input terminal of the video decoding apparatus 400 of FIG. 4.

The video encoding/decoding apparatus according to at least one embodiment of the present disclosure includes a video encoder for encoding a current block by intra-predicting the current block by using pixels of neighboring blocks adjacent to the current block and encoding an intra-prediction mode of the current block by excluding information on overlapping or unnecessary intra-prediction modes among all intra prediction modes from a candidate mode group or based on whether predicted values of intra-prediction modes of at least a preset number of subblocks are matched with actual intra-prediction modes, and a video decoder for reconstructing the intra prediction mode of the current block by excluding the overlapping or unnecessary intra-prediction modes among all the intra prediction modes from the candidate mode group and based on whether the predicted values of the intra-prediction modes of the preset number of subblocks are matched with the actual intra-prediction modes, generating a predicted block of the current block to be reconstructed by using a reconstructed intra-prediction mode, and reconstructing the current block.

Here, the video encoder can be implemented by the video encoding apparatus 100 according to at least one embodiment of the present disclosure, and the video decoder can be implemented by the video decoding apparatus 400 according to at least one embodiment of the present disclosure.

The video encoding method according to at least one embodiment of the present disclosure includes an intra-prediction encoding step S610 of encoding a current block by intra-predicting the current block by using pixels of neighboring blocks adjacent to the current block, and a prediction mode encoding step S620 of, when there is an absent neighboring block which cannot be used for the intra-prediction in neighboring blocks including pixels used for an intra-prediction mode, encoding information on an intra-prediction mode of the current block by excluding an intra-prediction mode using a pixel of the absent neighboring block from a candidate mode group.

The video encoding method according to at least another embodiment of the present disclosure includes an intra-prediction encoding step S710 of encoding a current block by intra-predicting the current block by using pixels of neighboring blocks adjacent to the current block, and a prediction mode encoding step S720 of encoding information on an intra-prediction mode of the current block by combining all intra-prediction modes using only pixels having similar values among pixels used for an intra-prediction mode into one mode and inserting the combined intra-prediction mode into a candidate mode group.

The video encoding method according to still at least another embodiment of the present disclosure includes an intra-prediction encoding step S810 of intra-prediction encoding subblocks of a current block by using pixels of neighboring blocks or subblocks adjacent to the subblocks, and a prediction mode encoding step S820 of encoding information on an intra-prediction mode including a prediction mode single coding flag indicating whether predicted values of intra-prediction modes of at least a preset number of subblocks are matched with actual intra-prediction modes.

Here, since the intra-prediction encoding steps S610, S710, and S810 may correspond to the operation of the intra-prediction encoder and the prediction mode encoding steps S620, S720, and S820 may correspond to the operation of the prediction mode encoder 182, detailed descriptions thereof will be omitted.

The video decoding method according to at least one embodiment of the present disclosure includes a prediction mode decoding step S910 of, when there is an absent neighboring block which cannot be used for an intra-prediction in neighboring blocks including pixels used for an intra-prediction mode, excluding an intra-prediction mode using a pixel of the absent neighboring block from a candidate mode group so as to reconstruct information on the intra-prediction mode from a bitstream, and an intra-prediction decoding step S920 of generating a predicted block of a current block to be reconstructed by using a reconstructed intra-prediction mode and reconstructing the current block.

The video decoding method according to at least another embodiment of the present disclosure includes a prediction mode decoding step S1010 of combining all intra-prediction modes using only pixels having similar values among pixels used for an intra-prediction mode into one mode and inserting the combined intra-prediction mode into a candidate mode group so as to reconstruct the intra-prediction mode from a bitstream, and an intra-prediction decoding step S1020 of generating a predicted block of a current block to be reconstructed by using a reconstructed intra-prediction mode and reconstructing the current block.

The video decoding method according to still at least another embodiment of the present disclosure includes a prediction mode decoding step S1110 of decoding information on an intra-prediction mode of a subblock of a current block to be reconstructed from a bitstream and reconstructing the intra-prediction mode based on a prediction mode single coding flag included in the information on the intra-prediction mode indicating whether predicted values of intra-prediction modes of at least a preset number of subblocks are matched with actual intra-prediction modes, and an intra-prediction decoding step S1120 of generating a predicted block of the current block to be reconstructed by using a reconstructed intra-prediction mode and reconstructing the current block.

Here, since the prediction mode decoding steps S910, S1010, and S1110 and the intra-prediction decoding steps S920, S1020, and S1120 may correspond to operations of the prediction mode decoder 440 and the intra-prediction decoder, respectively, detailed descriptions thereof will be omitted.

The video encoding/decoding method according to at least one embodiment of the present disclosure can be implemented by combining the video encoding method according to at least one embodiment of the present disclosure and the video decoding method according to at least one embodiment of the present disclosure.

The video encoding/decoding method according to at least one embodiment of the present disclosure includes encoding a current block by intra-predicting the current block by using pixels of neighboring blocks adjacent to the current block and encoding an intra-prediction mode of the current block by excluding information on overlapping or unnecessary intra-prediction modes among all intra prediction modes from a candidate mode group or based on whether predicted values of intra-prediction modes of at least a preset number of subblocks are matched with actual intra-prediction modes, and reconstructing the intra prediction mode of the current block by excluding the overlapping or unnecessary intra-prediction modes among all the intra prediction modes from the candidate mode group and based on whether the predicted values of the intra-prediction modes of at least the preset number of subblocks are matched with the actual intra-prediction modes, generating a predicted block of the current block to be reconstructed by using a reconstructed intra-prediction mode, and reconstructing the current block.

According to some embodiments of the present disclosure as described above, in a video encoding or decoding method or apparatus, when there is an absent neighboring block in encoding intra-prediction mode information, the mode information can be efficiently encoded by excluding an intra-prediction mode using a reference pixel of the absent neighboring block from a candidate mode group.

Further, in encoding the intra-prediction mode information, when reference pixels of neighboring pixels have similar values, the intra-prediction mode information is generated by unifying intra-prediction modes with the similar reference pixels into one combined mode, thereby efficiently encoding the mode information.

Moreover, by encoding the number and/or position of subblocks, of which MPMs are not equal (or matched) to actual intra-prediction modes, the mode information can be efficiently encoded.

Furthermore, by performing a decoding corresponding to the encoding method, the decoding can be performed with the corresponding efficiency to the efficient encoding.

Although exemplary embodiments of the present disclosure have been described for illustrative purposes, those skilled in the art will appreciate that various modifications, additions and substitutions are possible, without departing from the characteristics of the disclosure. Therefore, exemplary embodiments of the present disclosure have not been described for limiting purposes. Accordingly, the scope of the disclosure is not to be limited by the above embodiments.

The invention claimed is:

1. A video encoding apparatus, comprising:
an intra-prediction encoder configured to encode a current block by intra-predicting the current block by using pixels of neighboring blocks adjacent to the current block; and
a prediction mode encoder configured to encode intra-prediction mode information of the current block, wherein, when among the neighboring blocks adjacent to the current block there is an absent neighboring block which is not available for an intra-prediction mode, the prediction mode encoder is configured to encode the intra-prediction mode information of the current block using a minimum size of bits required for identifying the intra-prediction mode of the current block among a candidate mode group which includes only available intra-prediction modes.

2. A video decoding apparatus, comprising:
prediction mode decoder configured to exclude, when among neighboring blocks adjacent to a current block there is an absent neighboring block which is not available for an intra-prediction mode, the intra-prediction mode using a pixel of the absent neighboring block from a candidate mode group so as to reconstruct information on one or more intra-prediction modes of the current block from a bitstream, wherein the information on one or more intra-prediction modes is being represented with a minimum size of bits required for identifying the intra-prediction mode of the current block among the candidate mode group which includes only available intra-prediction modes;
and an intra-prediction decoder configured to generate a predicted block of the current block, by using the reconstructed one or more intra-prediction modes, for reconstructing the current block.

3. A video decoding method, the method performed by a video decoding apparatus and comprising:
excluding, when among neighboring blocks adjacent to a current block there is an absent neighboring block which is not available for an intra-prediction mode, the intra-prediction mode using a pixel of the absent neighboring block from a candidate mode group so as to reconstruct information on one or more intra-prediction modes of the current block from a bitstream, wherein the information on one or more intra-prediction modes is being represented with a minimum size of bits required for identifying the intra-prediction mode of the current block among the candidate mode group which includes only available intra-prediction modes;
generating a predicted block of the current block by using the reconstructed one or more intra-prediction modes; and
reconstructing the current block by using the predicted block.

* * * * *